United States Patent Office 3,520,828
Patented July 21, 1970

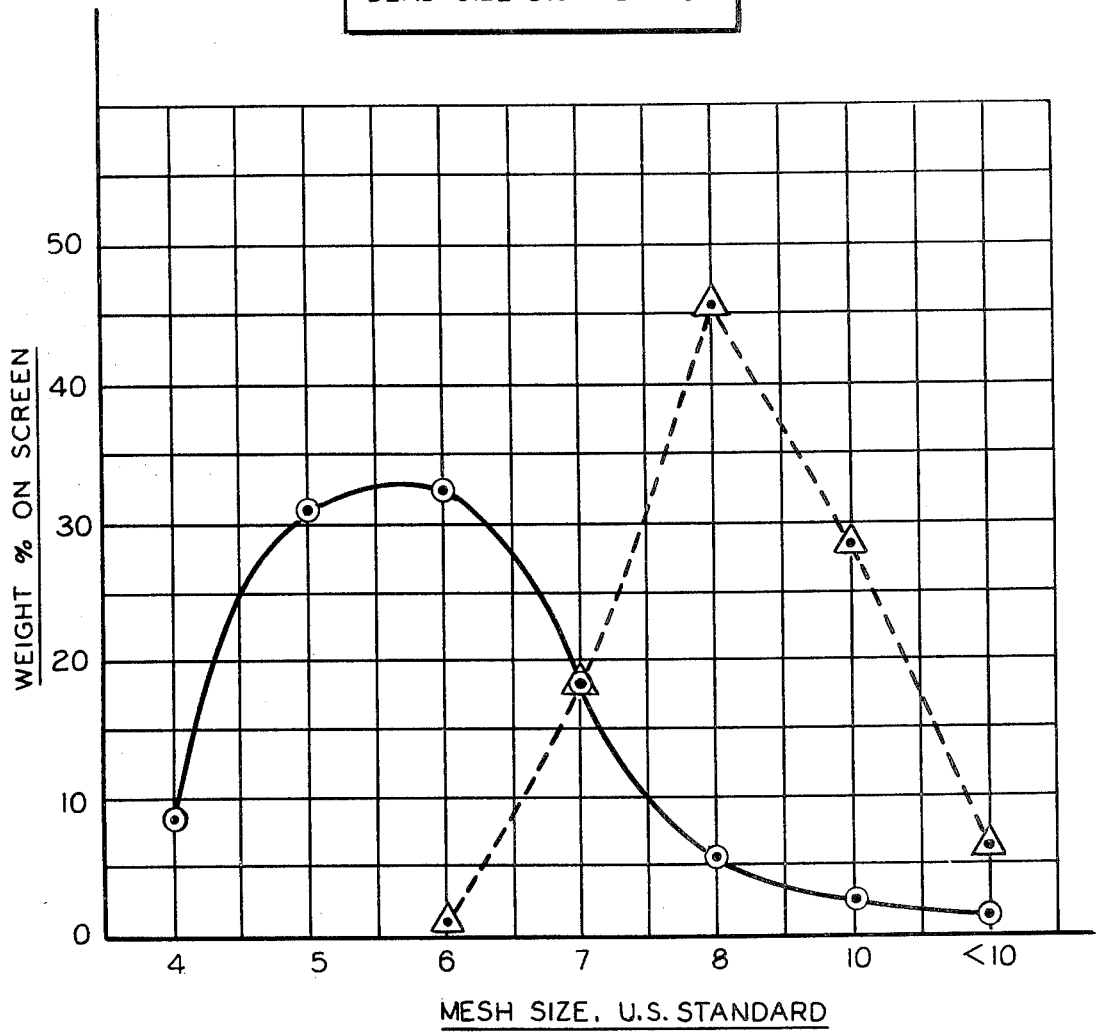

3,520,828
INORGANIC OXIDE GEL AND METHOD OF
PREPARING THE SAME
Edward J. Rosinski, Deptford, N.J., assignor to Mobil
Oil Corporation, a corporation of New York
Filed May 17, 1966, Ser. No. 550,719
Int. Cl. B01j 11/40
U.S. Cl. 252—453          6 Claims

ABSTRACT OF THE DISCLOSURE

Preparation of composite particles of an inorganic oxide gel, e.g. of silica-alumina, having fines dispersed therein, e.g. of crystalline aluminosilicate zeolite. Process comprises forming a rapidly gelling hydrosol of the inorganic oxide and spraying the hydrosol into a gaseous medium to form a stream of particles which are suspended therein for a time sufficient to effect gelation. Fines are incorporated in the hydrosol prior to gelation by dispersing the fines in the hydrosol prior to spraying or by spraying the hydrosol into a gaseous medium containing fines suspended therein. The product, in which the fines constitute greater than 40% by volume, is useful as a catalyst, as for hydrocarbon cracking.

---

This invention relates to a method of preparing an inorganic oxide gel in particulate form, including the bead form wherein the gel product is in the form of spheroidal particles, which product may be used as a catalyst and exhibits improved properties. More particularly, this invention relates to a method for producing a solid porous particulate catalyst comprising an inorganic oxide gel matrix having a high proportion of fines incorporated therein, which catalyst may be used for the catalytic cracking of hydrocarbons to thereby produce improved yields and a more desirable product distribution than that generally obtained when using catalysts of the prior art. The particulate products produced in accordance with the present invention may also be used in other catalytic processes and as desiccants.

Many operations for the conversion of hydrocarbon materials are carried out in the presence of inorganic oxide gels, which gels exert a catalytic action upon the hydrocarbons. Such inorganic oxide gels are generally prepared by the formation of a sol of a desired composition, which sol will set to form a hydrogel after a lapse of a suitable period of time. The resulting hydrogel is washed to remove impurities and then dried to remove the liquid phase therefrom. Typical solid porous catalysts of this type include gels of silica, alumina, zirconia, magnesia, and the like. Such gels frequently comprise a cogel or a composite of two or more inorganic oxides, for example, silica-alumina, silica-zirconia, silica-magnesia, silica-alumina-zirconia, silica-alumina-chromia, and the like.

Of the present commercially available catalyst, synthetic silica-alumina catalyst are by far the most widely used. While such catalysts are in many ways superior to the previously employed clay catalysts and are satisfactory in many respects, they are somewhat lacking in certain attributes that are desirable in a present day catalyst cracking catalyst. In particular, efforts have been made to increase the yield of gasoline obtainable by the use of such silica-alumina catalysts, which yield, although appreciable, is not so high as has been desired.

In addition, modern catalytic cracking processes require a catalyst which is not only specifically active for the chemical reactions which are to be catalyzed but also possesses physical characteristics required for commercially successful operation. One of the important physical attributes of a commercial catalyst is hardness, i.e., the ability to resist attrition. The ability of a particle to hold its shape in withstanding the mechanical handling to which it is subjected upon storage, shipment and use is therefore a significant requirement for a successful cracking catalyst. Catalytic cracking operations in which heavy petroleum fractions are converted to lighter materials boiling in the range of gasoline are carried out in the presence of a solid porous catalyst, generally a composite of silica-alumina which may contain a minor proportion of one or more added metals or metal oxides. These catalytic processes are generally advantageously carried out employing methods wherein the catalyst mass is subjected to continuous handling. In such operations a continuously moving stream of hydrocarbon feed is contacted with a continuously moving stream of catalyst for the accomplishment of conversion and thereafter the catalytic material is continuously regenerated and returned to the conversion zone. This continuous handling and regeneration of the catalyst particles results in considerable breakage and constant abrasion, consuming the catalyst and giving rise to an excessive amount of fine which generally cannot be reused in the same catalytic equipment. Furthermore, there is a tendency for the catalyst fines suspended in the gas or vapor present to act as an abrasive in a manner analogous to sand blasting. This not only wears away the equipment but also causes the catalyst to take up foreign matter detrimental to its catalytic properties. A hard porous catalyst having the ability to withstand abrasion during the various handling operations during conversion and regeneration is therefore highly desirable.

Another important physical attribute of a modern-day cracking catalyst is its diffusivity, that is, the relative ability of fluids to diffuse therethrough. A high catalyst diffusivity permits more rapid diffusion of hydrocarbon vapors and other gases throughout the catalyst structure, thereby making possible the use of higher space velocities of hydrocarbons and requiring less time for regeneration of the catalysts when they have become fouled with carbonaceous materials. In present commercial cracking units, carbon burning capacity of the regenerator is the primary limiting factor on conversion capacity for the unit and on conversion level per pass. It is accordingly desirable to increase carbon burning capacity by improving the carbon burning rate for the spent catalysts.

One inorganic oxide gel that has received particular attention is silica-alumina into which has been incorporated a certain proportion of fines. These fines comprise a solid powdered material that is insoluble in the initial hydrosol so that they retain their discrete character in the resultant hydrogel. It has been found that the incorporation of such fines into the oxide gel results in a catalyst having improved attrition resistance and improved hardness. U.S. Pat. 2,900,349 describes in considerable detail the preparation of such fines-containing catalysts. The addition of high density fines to any catalyst will increase the catalyst density and will also improve the catalyst attrition resistance and diffusivity. The increase in density will permit greater hydrocarbon throughput in moving bed units. The increased attrition resistance will result in lower catalyst makeup rates. Higher diffusivities result in a catalyst having a faster coke burning rate.

In typical prior methods of forming catalysts having fines distributed therein, the fines are dispersed in an inorganic oxide sol which sol solution is then divided into small streams over a suitable dividing surface, e.g., a cone. The small streams form droplets in an immiscible liquid such as oil, which droplets then are permitted to form bead hydrogel in their paths through the immiscible liquid.

One limitation of these prior processes is that heretofore it has been virtually impossible to incorporate into the hydrogel matrix a very large volume percent of fines, based on the overall volume of the dried composite. For example, where the density of the fines and matrix is the same, the total amount of fines which can be incorporated into the matrix does not exceed about 30 percent by volume of the final dry composite. Thus, in order to make a catalyst composite of an inorganic oxide gel matrix and containing, on a dry basis, greater than about 30 percent by volume of fines, it is necessary that the solids content of the hydrosol be at least about 12 percent by weight, and generally higher. This high level of fines results in a decrease in gel time, so that gelation tends to commence before the hydrosol globules have reached the liquid medium, e.g., oil, wherein it is desired that gelation occur. Moreover, if it is attempted to overcome the foregoing drawback by increasing the gel time, as by utilizing a more dilute hydrosol, the resulting catalyst is overly "frail" and does not possess the requisite resistance to attrition.

The present invention provides a novel method for the preparation of a particulate inorganic oxide gel catalyst having incorporated therein a high concentration of active or inactive fines.

The invention further provides a method for preparing such particulate inorganic oxide gel in spheroidal form.

The invention additionally provides a novel method for the preparation of particles of inorganic oxide gel catalyst coated on the surface thereof with active or inactive fines.

A further characteristic of the present invention is the provision of a new and useful bead catalyst comprising an inorganic oxide gel matrix having fine particles incorporated therein, which catalyst affords considerable catalytic advantages, particularly in the conversion of hydrocarbons. These advantages are reflected in high resistance to attrition, high activity and high selectivity. For example, such catalyst affords improved gasoline yields and improved product distribution as compared to the corresponding gasoline yield and product distribution when using conventional bead catalysts.

One particularly advantageous feature of this invention lies in the greatly improved diffusion properties resulting from the relatively greater amount of fines present. This feature is of particular significance in the development of the recent species of ultra active aluminosilicate catalysts. The availability of the active component to the charged hydrocarbons becomes a very important factor in the overall catalytic performance. Not only is it important to get the hydrocarbon charge to the active component but it is also very necessary to get the converted product out of the super active component. Excessive exposure of the converted products to the super active component leads to excessive further conversion of the products to the less desirable low molecular weight hydrocarbons.

Additional characteristics and advantages of this invention will become apparent from the following detailed description, taken in conjunction with the accompanying drawing wherein the figure is a plot of particle size distribution for bead catalysts made by the method of the present invention as compared to particle size distribution for a conventional bead catalyst.

In accordance with one aspect of this invention, an improved inorganic oxide gel particulate catalyst containing over 40% by volume on a dry basis of active or inactive fines may be prepared by forming an inorganic oxide solution and an acid solution, incorporating the desired amount of fines in one or both of these solutions, combining these solutions to thereby form a hydrosol having a gel time of less than about 2 seconds, preferably less than about 1 second, and expelling the sol into air or other suitable gaseous medium in such manner that the hydrosol stream forms into droplets during travel in the gaseous medium, which droplets set to a hydrogel while suspended in the gaseous medium. The hydrogel particles may then, if desired, be treated with salt solutions, e.g., solutions of rare earth salts, to effect cation exchange, dried, calcined and then stabilized by appropriate heat treatment.

In accordance with a further aspect of this invention, the foregoing procedure is employed, except that the gel time is of extremely short duration, such that as the stream of hydrosol is expelled into the atmosphere it gels virtually instantaneously to form a "solid stream" which immediately breaks up into cylindrically shaped particles. Thus, the hydrosol sets to a hydrogel before the hydrosol stream has time to assume the form of spheroidal particles.

In accordance with another aspect of my invention, the catalyst is prepared as described above except that instead of incorporating the fine particles in the hydrosol, the hydrosol is sprayed into a gaseous atmosphere in which the fines are suspended. This results in the incorporation of the fines in the hydrogel particles, particularly at and near the surface thereof.

The foregoing embodiment is especially useful where "active" fines, e.g. rare earth aluminosilicate zeolite fines, are employed, inasmuch as it permits maximum catalytic effect with minimum use of fines since the fines are at and near the surface of the catalyst.

In accordance with yet another aspect of this invention the above two procedures may be combined by incorporating some fines in the hydrosol and suspending fines of the same or a different kind in the gaseous atmosphere into which the hydrosol is sprayed. This permits one to obtain a catalyst having two different types of activity, one at the surface and one at the interior. For instance, faujasite fines can be incorporated in the hydrosol whereas shape selective fines, e.g., offretite, can be suspended in the gaseous medium, whereby the resulting catalyst will contain faujasite fines throughout its interior and offretite fines at and near the surface.

The gelation time of the sol may be controlled by proper adjustment of pH, temperature and concentration of the forming solutions. The gel time should be less than 2 seconds and preferably should be less than 1 second.

The pH of the sol should be between about 7 and 10. A more preferred pH range is from 7.5 to 9.0.

The temperature of the hydrosol may vary widely, e.g., from about the freezing temperature to the boiling temperature of the hydrosol. Generally room temperature is preferred.

The hydrosol concentration should be such as to yield between about 100 and 500 grams of solids as oxides per liter of hydrosol.

As previously noted, a short gel time is required, i.e., less than two seconds and preferably less than one second. The gel time is readily controlled by appropriate adjustment of the temperature and concentration of the hydrosol. Thus, the higher the temperature and/or concentration, the faster the gel time.

A horizontal flight path of hydrosol through the gaseous medium of about 2 to 10 feet is generally sufficient to allow formation of the hydrogel particles. Of course, if the flight path is vertically downward, a greater length would be required.

The size range of catalyst produced may be controlled by varying the discharge opening of the nozzle assembly. It is preferred that the particle size be from about 300 to 4000 microns. By suitable control of the nozzle discharge opening and consequently of the size and shape of the sol stream discharged into the gaseous atmosphere, catalysts having a wide or narrow range of diameters can be produced as desired. The diameters can be varied within a range of from about 5 mesh to $<40$ mesh U.S. Standard Sieve Series.

The following screen analysis illustrates the wide size range of bead catalysts possible with this method of bead forming. The nozzle stream was intentionally constricted to yield this wide distribution.

| Mesh size: | Wt. percent on screen |
|---|---|
| 5 | 0.2 |
| 6 | 3.3 |
| 7 | 7.3 |
| 8 | 15.6 |
| 10 | 20.8 |
| 14 | 29.8 |
| 16 | 9.1 |
| 25 | 10.5 |
| 30 | 1.2 |
| 40 | 1.1 |
| Pan | 1.1 |

The accompanying figure presents a comparison of the size distribution of air formed bead catalysts made under closely controlled conditions in accordance with the present invention as against that of conventionally formed bead cracking catalysts. The narrow particles size range which can be achieved with the air forming method is illustrated by the dashed line curve. This narrow range of bead catalyst was formed by unconstricted flow through a one-eighth inch nozzle discharge tube. Larger beads could be made by increasing the size of this tube.

The relatively narrow particle size distribution attainable by the present invention is advantageous for a number of reasons. Thus the beads are more easily transported for unit operations such as air lifting. Excessive lift velocities, which generally have been required heretofore to lift very large beads, can thereby be avoided. Additionally, the beads undergo less attrition during handling, show superior flow characteristics, and their use in catalytic cracking results in more uniform conversion of hydrocarbons.

The forming medium may be an inert, non-drying gas such as air, nitrogen or the like. Drying gas may also be used as the forming medium. If desired, a reactive gaseous medium may be used, e.g. an acid medium such as HCl or a basic medium such as $NH_3$.

The nature of the inorganic oxide gel matrix is not critical. Thus, suitable inorganic oxide gels include silica and alumina, as well as composites of silica and an oxide of at least one metal selected from the group consisting of metals of Groups II-A, III-B and IV-A of the Periodic Table, e.g. Si/Al, Si/Zr, Si/Mg, Si/Al/Zr, Si/Al/Mg, Si/Hf and the like.

The fine particles which are incorporated in the inorganic oxide sol prior to gelation thereof should have a weight means particle diameter of less than about 10 microns, preferably less than about 7 microns, and most preferably less than about 5 microns but not less than about 0.5 micron. Of course, the fines must be insoluble in the hydrosol.

The fines may be made up of a variety of active or inactive materials. The materials include, for example, clay, alumina, zircon, barytes, carbon, wood flour, silica, recycle catalyst fines, magnesia, spent cracking catalyst fines and various ores and naturally occurring materials including the various natural zeolites.

Preferred active fines are the various synthetic crystalline aluminosilicates, e.g., those known in the art as the X- and Y-type zeolites in which at least about 90% of the alkali metal originally contained in the aluminosilicate is replaced by base-exchange. It is also feasible to base-exchange after the alkali metal aluminosilicate has been composited with the gel matrix. Any ionizable compound of a metal capable of replacing the alkali metal may be employed for base-exchange either alone or in combination with other ions. Compounds will be used wherein the replacing ion is in the cationic state. Inorganic salts will usually be employed. Suitable materials include soluble compounds of calcium, magnesium, manganese, vanadium, chromium, cerium, aluminum, lanthanum, praesodymium, neodymium, samarium and other rare earths, as well as solutions containing mixtures of these ions and mixtures of the same with other ions, such as ammonium. Organic salts of the foregoing metals, such as acetates and formates may also be used, as well as very dilute or weak acids. A particularly effective base-exchange solution is one containing calcium and ammonium ions in a ratio in the range of about 20/1 to 0.5/1 and preferably 10/1 to 1/1, to effect replacement of the alkali metal ion with calcium and ammonium ions. Most particularly preferred are those aluminosilicates wherein the replacing ion is an ion or mixture of ions of rare earth metals.

When the particulate catalysts of this invention are employed for hydrogenation and dehydrogenation, additional cations may be utilized as the replacing ions, e.g., Pt, Pd, Co, Ni and Cr.

Preparation of the above snythetic zeolites has been described in the literature; for example, X-type zeolite in U.S. Pat. 2,882,244 and Y-type zeolite in Belgian Pats. 577,642 and 598,582. These materials are essentially the dehydrated forms of crystalline hydrous siliceous zeolites containing varying quantities of alkali metal and aluminum with or without other metals. The alkali metal atoms, silicon, aluminum and oxygen in these zeolites are arranged in the form of an aluminosilicate salt in a definite and consistent crystalline pattern. The structure contains a large number of small cavities inter-connected by a number of still smaller holes or channels. These cavities and channels are precisely uniform in size. For example, the molar composition of the Y-zeolite falls within the general formula:

$$0.9 \pm 0.2 Na_2O_3 : 3 - 6.5 SiO_2 \cdot 9H_2O$$

The above zeolite has a uniform pore structure comprising openings characterized by an effective pore diameter of between 6 and 15 angstroms.

The catalytic selectivity of the above-described composition is greatly improved by subjecting the same to a mild steam treatment. Exposure of the catalyst to steam is a highly desirable step in obtaining a product capable of affording an enhanced yield of gasoline. Steam treatment may be carried out at a temperature within the approximate range of 800° F. to 1500° F. for at least about 2 hours. Usually, steam at a temperature of about 1000° F. to 1300° F. will be used with the treating period extending from about 2 to about 100 hours. Temperatures above 1500° F. may be detrimental and should generally be avoided.

Of course, active fines may includes crystalline aluminosilicate zeolites other than the X- and Y-type, e.g., zeolite A, ZK4, offretite, etc.

The method of this invention permits one to readily obtain composite catalysts made up of an inorganic oxide gel matrix having a high proportion of fines dispersed therein. The amount of fines in the final dry composite should be in excess of 40% by volume of the composite, generally from about 41 to 75 volume percent. A more preferred range is from about 41 to 65 percent by volume.

The following examples will further illustrate my invention. All parts are by weight unless otherwise indicated.

EXAMPLE 1

This example demonstrates that catalyst particles having a high level of active component can be prepared in bead form by an air forming method. A catalyst containing 41.8 volume percent active component (rare earth Y crystalline aluminosilicate) was made in this case. Satisfactory catalysts containing this level of active component can not be made by conventional bead forming methods.

The catalyst was prepared by mixing the following silicate and acid solutions together through a mixing nozzle.

(A) Silicate solution (1) 8.26 lbs. of N Brand sodium silicate (28.9 wt. percent $SiO_2$, 8.9 wt. percent $Na_2O$, 62.2 wt. percent $H_2O$) 2.70 lbs. of water
(2) 6.67 lbs. sodium Y aluminosilicate 38 wt. percent solids 1.69 lbs. water These two solutions were mixed together forming a solution having a specific gravity of 1.273 at 78° F.

(B) Acid solution 57.1 lbs. water
4.23 lbs. $Al_2(SO_4)_3 \cdot 18H_2O$
1.98 lbs. $H_2SO_4$ (97%)
Sp. Gr. 1.054 at 81° F.

Solutions A and B were mixed together in a mixing nozzle, the silicate solution which was at 149° F., flowing at 400 cc./min. and the acid solution which was at 78° F., flowing at 362 cc./min. to form a hydrosol which gelled in less than 1 second. The resulting bead hydrogel [formed during flight] had a pH of about 8.8 to 9.1. The calculated composition was 49.8 wt. percent silica-alumina matrix having a 5.43 wt. percent $Al_2O_3$ content and 50.2 wt. percent crystalline aluminosilicate of the sodium Y type. The total oxide content of the formed hydrogel was 175.7 g. oxide per 1000 cc.

This bead hydrogel was first contacted with a 5 wt. percent solution of $RECl_3 \cdot 6H_2O$ for 72 hours at 180° F. and then continuously with a solution of 5 wt. percent $RECl_3 \cdot 6H_2O$ until the residual sodium was reduced to 0.4 wt. percent. The rare earth chloride base exchange was followed by water washing free of chloride ion, drying at 275° F., calcining 10 hours at 1000° F., steaming for 24 hours at 1200° F. with steam at 15 p.s.i.g.

The final catalyst analyzed 0.14 wt. percent Na and 16.1 wt. percent $(RE)_2O_3$ (41.8 volume percent REY aluminosilicate) and had a surface area of 320 m.²/g. after steaming at 1200° F. with steam at 15 p.s.i.g. for 48 hours.

The catalytic performance of the foregoing catalyst (at 900° F. charging Wide Range Mid-Continent Gas Oil at 16 LHSV and 0.38 C/O) is summarized in the following table.

Conditions:
| | |
|---|---|
| LHSV | 16 |
| C/O | 0.38 |
| Temperature, ° F. | 900 |
| Conversion, vol. percent | 60.6 |
| $C_5+$ gasoline, vol. percent | 53.2 |
| Total $C_4$'s, vol. percent | 11.7 |
| Dry gas, wt. percent | 5.0 |
| Coke, wt. percent | 1.2 |
| $H_2$, wt. percent | 0.02 |

Delta advantage over conventional silica-alumina catalyst [1]

| | |
|---|---|
| $C_5+$ gasoline, vol. percent | +10.4 |
| Total $C_4$'s, vol. percent | −4.7 |
| Dry gas, wt. percent | −2.9 |
| Coke, wt. percent | −3.3 |

[1] 90% silica—10% alumina.

The increase in yield of $C_5$'s + gasoline and decrease in yield of dry gas and coke for this catalyst as compared to a conventional silica-alumina catalyst at the same conversion is readily apparent.

EXAMPLE 2

This example illustrates the preparation of catalyst particles containing 62 percent by volume of fines (clay fines plus active crystalline aluminosilicate of the REY type).

The following solutions were prepared.

(A) Silicate solution (1) 8.72 lbs. of N Brand Sodium Silicate (28.9 wt. percent $SiO_2$, 8.9 wt. percent $Na_2O$, 62.2 wt. percent $H_2O$), 4.36 lbs. of water, 11.22 lbs. of Kaolin Clay (87% wt. solids at 1000° F.)
(2) 1.57 lbs. rare earth Y aluminosilicate (87.9% wt. solids at 1000° F.), 2.71 lbs. water, 30.3 g. Dispersant Marasperse N.

Solutions 1 and 2 were mixed together forming a slurry having a specific gravity of 1.359 at 97° F.

(B) Acid solution 20.6 lbs. water
3.03 lbs. $Al_2(SO_4)_3 \cdot 18H_2O$
1.38 lbs. $H_2SO_4$ (95.7%)
Specific Gravity 1.107 at 82° F.

Solutions A and B were mixed together through a mixing nozzle, flowing 444 ml. per minute of silicate solution at 143° F. and 116 ml. per minute of acid solution at 64° F., to form a hydrosol which set almost immediately into a solid stream which broke up into cylindrically shaped particles. This hydrogel had a pH of 9.6. The calculated oxide content of this preparation was 432 g./1000 ml.

The resulting hydrous product was base exchanged with 1.4 wt. percent $(NH_4)_2SO_4$ solution continuously for 24 hours at room temperature followed by water washing free of sulfate ion. It was then dried for 20 hours at 450° F., calcined for 10 hours at 1000° F. and finally steamed for 24 hours at 1200° F. with steam at 15 p.s.i.g.

The final catalyst analyzed 0.15 wt. percent Na and had a surface area after the steaming of 72 m.²/g.

The calculated composition of the resulting catalyst on an anhydrous basis was 19.28 wt. percent silica-alumina catalyst having 5.45 wt. percent $Al_2O_3$ content, 9.98 wt. percent rare earth Y aluminosilicate and 70.74 wt. percent fines as clay.

The catalytic performance of this product (4 LHSV and 1.5 C/O at 900° F. using Mid-Continent-Wide Range Gas Oil) is summarized in the following table.

Conditions:
| | |
|---|---|
| LHSV | 4 |
| C/O | 1.5 |
| Temperature, ° F. | 900 |
| Conversion, vol. percent | 58.8 |
| $C_5+$ gasoline, vol. percent | 49.8 |
| Total $C_4$'s, vol. percent | 11.7 |
| Dry gas, wt. percent | 5.4 |
| Coke, wt. percent | 2.0 |
| $H_2$, wt. percent | 0.01 |

Delta advantage over conventional silica-alumina catalyst [1]

| | |
|---|---|
| $C_5+$ gasoline, vol. percent | +7.9 |
| Total $C_4$'s, vol. percent | −4.6 |
| Dry gas, wt. percent | −2.3 |
| Coke, wt. percent | −2.2 |

[1] 90% silica—10% alumina.

The foregoing data shows the marked catalytic advantage of this catalyst over a conventional silica-alumina catalyst evaluated at the same conversion.

It will be apparent that the method of this invention offers a number of advantages. It enables one to introduce into an inorganic oxide gel matrix a markedly higher proportion of fines than is possible when effecting gelation in liquid media. Thus, with the conventional technique of forming bead catalysts by permitting a hydrosol to set to a hydrogel while suspended in a liquid medium, e.g., oil, the oxides content of the hydrosol cannot exceed about 120 grams per liter. This is tantamount to a product concentration in the resulting hydrogel of 12%. In contrast, inasmuch as the present gas-forming method contemplates and requires fast gel times, hydrosols having a far higher solids content, e.g., 450 grams per liter, can be utilized. Accordingly, the use of such high solids hydrosol can vastly increase the capacity of a bead plant without increasing costs.

Yet another advantage of the present invention is in the savings afforded by utilizing a gas, e.g., air rather than oil as the medium in which gelation is effected. Indeed, is it generally recognized that in a catalyst plant producing 40 tons of catalyst per day, the loss in oil during that day will be on the order of several hundred dollars.

The present invention affords further economies inasmuch as there is no need to refrigerate the gel-forming solutions so as to slow down the gel time, such refrigeration generally being required in present facilities wherein gelation is effected in a liquid medium.

Variations can of course be made without departing from the spirit and scope of this invention.

Having thus described my invention, what I desire to secure and claim by Letters Patent is:

1. A method for preparing composite particles of an inorganic oxide gel having fines having a weight mean particle diameter of less than about ten microns dispersed therein, said particles having a maximum dimension of from about 300 to 4000 microns, comprising forming a hydrosol of said inorganic oxide, said hydrosol having a pH of from about 7 to 10 and a gel time of less than about 2 seconds, suspending said fines in a gaseous medium, and spraying said sol into said fines-containing gaseous medium, whereby there are formed hydrosol particles containing said fines dispersed on the surface thereof, said hydrosol particles subsequently setting to fines-containing gel particles.

2. The method of claim 1 wherein fines are also incorporated in said hydrosol prior to spraying into the gaseous medium, whereby fines are distributed throughout the body of the resulting gel particles and are additionally distributed on the surface of said gel particles.

3. The method of claim 2 wherein said fines incorporated in said hydrosol are of a different chemical composition from said fines suspended in said gaseous medium.

4. A catalyst comprising particles of an inorganic oxide gel matrix having incorporated therein fines having a weight mean particle diameter of less than about 10 microns, said particles having a maximum dimension of from about 300 to 4000 microns, said fines constituting greater than 40 percent by volume, on a dry basis, of said particles, said fines being substantially entirely on the surface of said catalyst particles.

5. The catalyst of claim 4 wherein said fines comprise a crystalline aluminosilicate zeolite.

6. A catalyst comprising particles of an inorganic oxide gel matrix having incorporated therein fines having a weight mean particle diameter of less than about 10 microns, said particles having a maximum dimension of from about 300 to 4000 microns, said fines constituting greater than 40 percent by volume, on a dry basis, of said particles, said fines being distributed on the surface of said catalyst particles and in the interior thereof, said fines on the surface being of a different chemical composition from said fines in the interior.

References Cited

UNITED STATES PATENTS

| | | | |
|---|---|---|---|
| 2,839,133 | 5/1958 | Brendel | 159—48 |
| 2,900,349 | 8/1959 | Schwartz | 252—451 XR |
| 3,094,383 | 6/1963 | Dzierzanowski et al. | 159—48 XR |
| 3,238,147 | 3/1966 | Cramer et al. | 252—453 |
| 3,281,216 | 10/1966 | Mindick | 159—48 XR |

DANIEL E. WYMAN, Primary Examiner

C. F. DEES, Assistant Examiner

U.S. Cl. X.R.

252—448, 455

UNITED STATES PATENT OFFICE
CERTIFICATE OF CORRECTION

Patent No. 3,520,828  Dated July 21, 1970

Inventor(s) E. J. ROSINSKI

It is certified that error appears in the above-identified patent and that said Letters Patent are hereby corrected as shown below:

Col. 6, Line 32 "$0.9\pm0.2Na_2O_3:3-6.5SiO_2\cdot 9H_2O$" should be

--$0.9\pm0.2\ Na_2O : Al_2O_3 : 3 - 6.5\ SiO_2 \cdot 9\ H_2O$--

Col. 7, Line 11 "$Al_2(SO_4))_3\cdot 18H_2O$" should be --$Al_2(SO_4)_3\cdot 18H_2O$--

SIGNED AND
SEALED
NOV 3 1970

(SEAL)
Attest:

Edward M. Fletcher, Jr.
Attesting Officer

WILLIAM E. SCHUYLER, JR.
Commissioner of Patents